Nov. 21, 1967  C. W. MacMILLAN  3,353,278
INDICATING ATTACHMENT FOR WHEEL ALINEMENT TESTERS
Filed Aug. 24, 1964  3 Sheets-Sheet 2
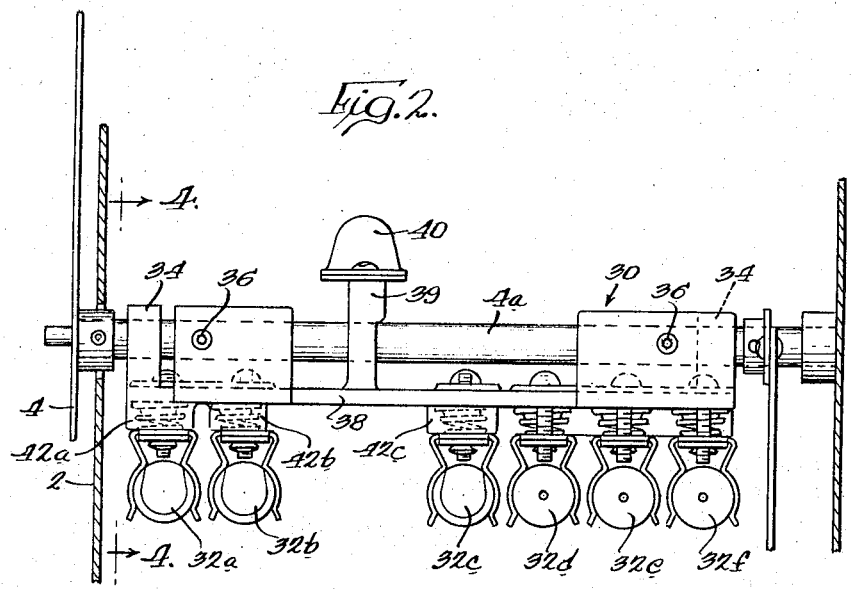
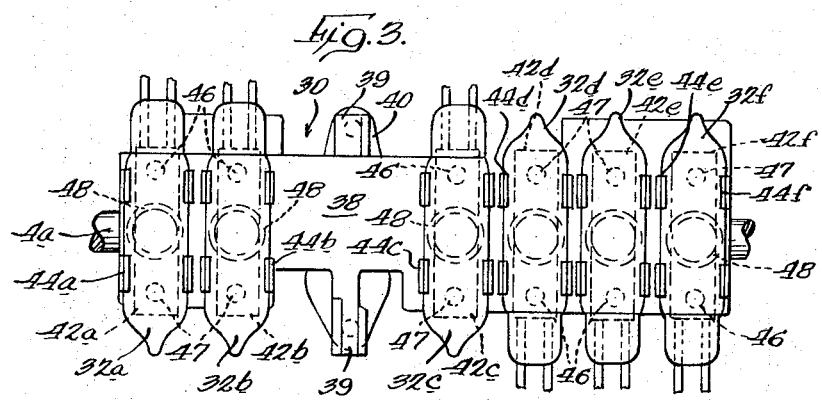
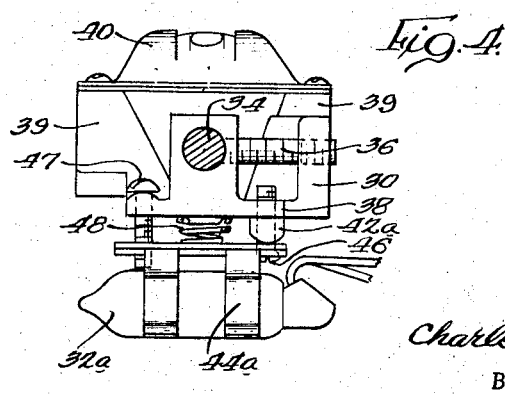
INVENTOR.
Charles W. MacMillan
BY
Gary, Parker, Juettner & Cullinan
Attys Nov. 21, 1967  C. W. MacMILLAN  3,353,278
INDICATING ATTACHMENT FOR WHEEL ALINEMENT TESTERS
Filed Aug. 24, 1964  3 Sheets-Sheet 3
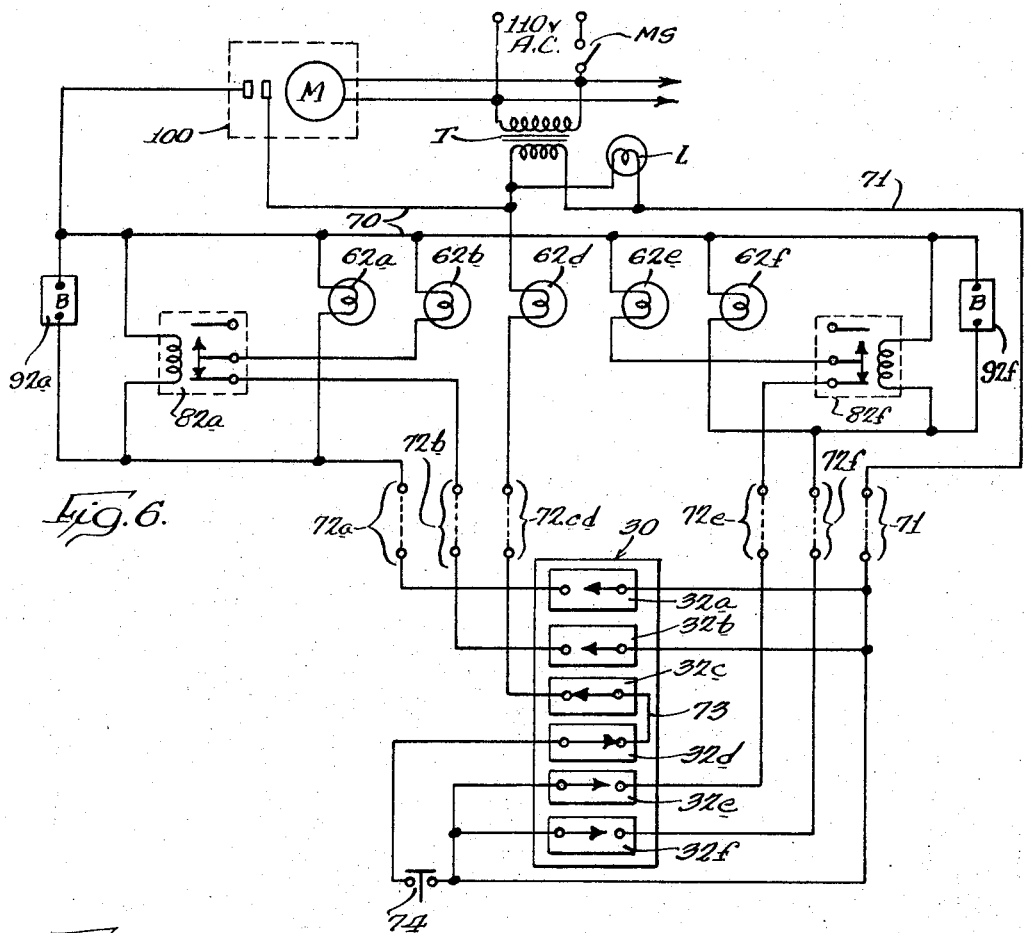
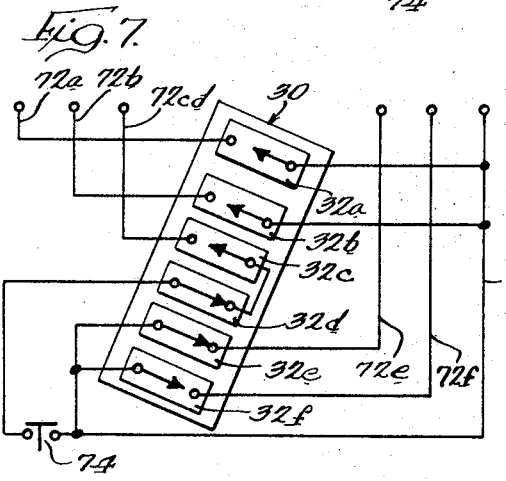
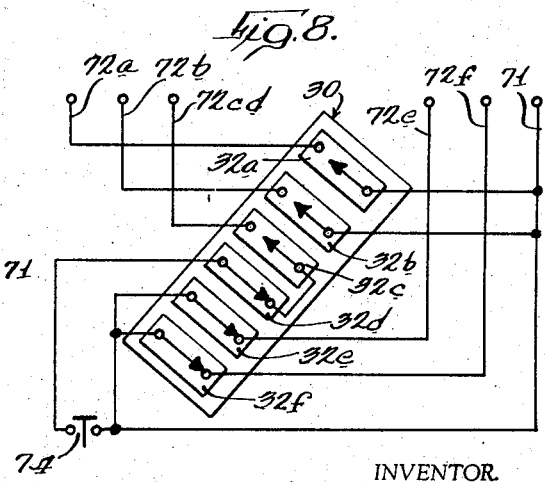
INVENTOR.
Charles W. MacMillan
BY
Gary, Parker, Juettner & Cullinan
Attys

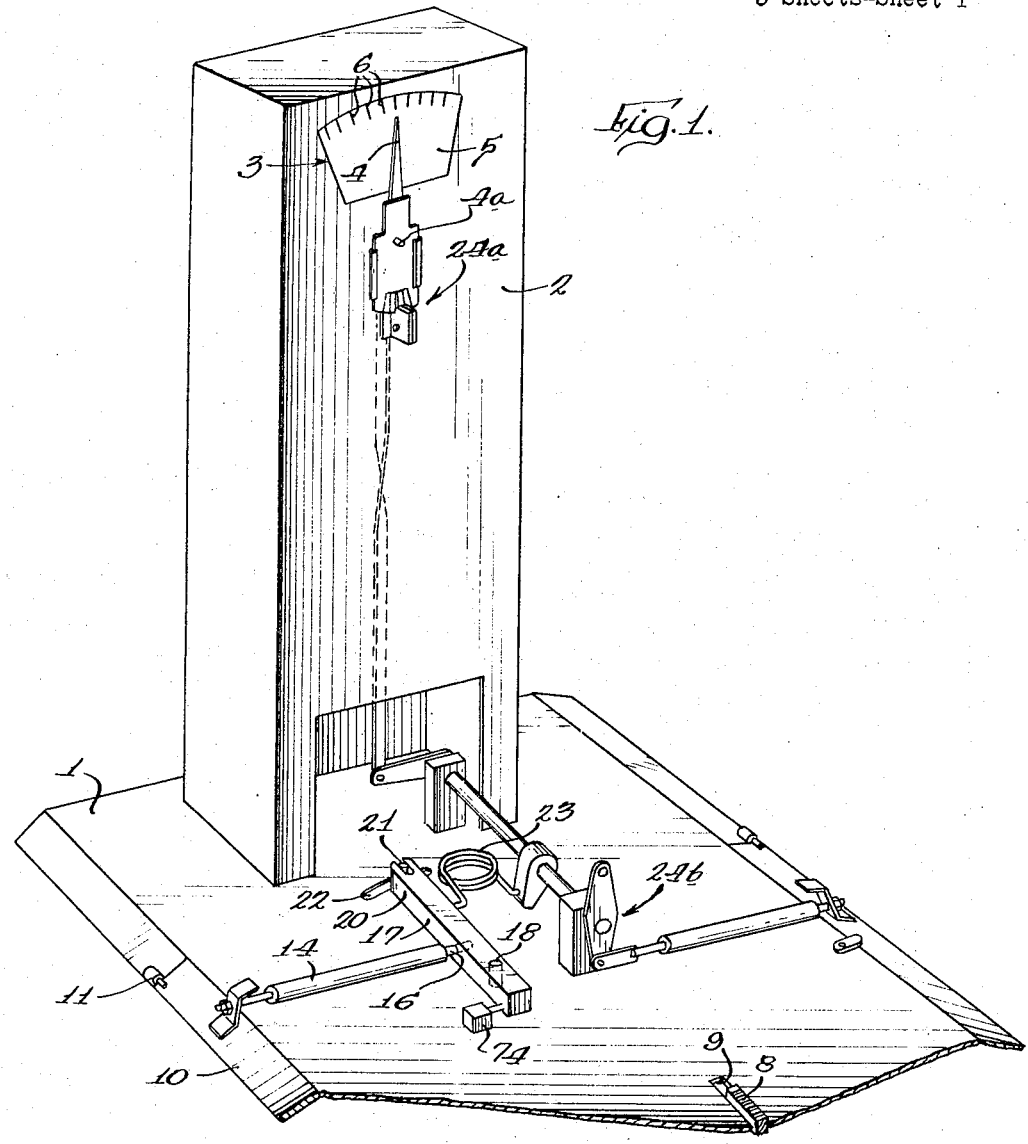

United States Patent Office 3,353,278
Patented Nov. 21, 1967

3,353,278
INDICATING ATTACHMENT FOR WHEEL ALINEMENT TESTERS
Charles W. MacMillan, Rock Island, Ill., assignor to Bear Manufacturing Company, Rock Island, Ill., a corporation of Delaware
Filed Aug. 24, 1964, Ser. No. 391,511
9 Claims. (Cl. 33—203.14)

The present invention relates to apparatus for testing the alinement of the steering wheels of vehicles, and particularly, to apparatus for determining the scuffing action between the steering wheel, tires and the road and indicating the correction required to reduce scuffing, minimize tire wear and obtain optimum steering conditions.

United States Patent 1,890,218 to J. F. Duby discloses apparatus for determining the scuffing action, if any, between a vehicle tire and the road. The apparatus comprises a drive-over support, wheel contacting elements engaged by the tires and shifted thereby, if scuffing is present, to a degree proportional to the scuffing or side slipping action of the tires, and an indicator coupled to said elements for indicating whether the scuffing is to the left or right and the amount thereof, e.g., the side drag in feet per mile. If no side drag or scuffing is present, the indicator provides a center reading to show that no correction is required. If scuffing is present, correction may be effected in manners well-known to automotive personnel by adjustment as necessary of one or more of the major angular relationships of steering wheels, i.e., camber, caster, steering axis inclination, turning radius and toe.

The object of the present invention is to provide in wheel alinement testing apparatus of the type described means for automatically affording visual and/or audible indications of the test results in a manner having substantial consumer impact, whereby to impress upon the vehicle owner or operator the necessity for proper wheel alinement.

More particularly, it is an object of the invention to provide in wheel alinement testing apparatus sign and signal means whereby the vehicle owner is apprised visually and/or audibly of the fact that the wheel alinement of his vehicle is good, poor, or hazardous; and also to relate wheel alinement, if poor or hazardous, to the amount of extra wear that the vehicle tires are being subjected to because of mis-alinement.

A further object of the present invention is to incorporate into wheel alinement testing apparatus of the character described switch means connected to and actuated by said wheel contacting elements to cause closing of respective switches in proportional relation to the side slip, drag or scuffing of the vehicle tires, and illuminable sign and/or audible signal means having a plurality of clearly distinguishable indicating means coupled respectively to said switch means for providing a visual and/or audible signal proportional in degree to the degree of mis-alinement of the vehicle wheels.

A still further object of the invention is the provision of improved indicating means as aforesaid that in no way interfere with the normal operation of the testing apparatus, and that particularly accommodate indication to the garage owner or mechanic of the toe condition of the vehicle wheels, i.e., whether they are toed-in or toed-out, and the precise degree thereof.

Other objects and advantages of the invention will become apparent in the following detailed description of a preferred embodiment of the invention.

Now, in order to acquaint those skilled in the art with the manner of making and using my new indicating means, I shall describe, in connection with the accompanying drawings, a preferred embodiment of my indicating means and the preferred manners of making and using the same.

In the drawings:

FIGURE 1 is a perspective view of the indicator end portion of wheel alinement testing apparatus of the character above described;

FIGURE 2 is a side view, on an enlarged scale, of the pointer shaft and pointer of the apparatus shown in FIGURE 1, together with a preferred embodiment of the indicating switch means of the present invention;

FIGURE 3 is a bottom view of said switch means;

FIGURE 4 is an end view of said switch means taken substantially on line 4—4 of FIGURE 2;

FIGURE 5 is a front view of a preferred embodiment of an illuminable sign electrically coupled to said switch means and adapted to be disposed in a location within convenient view of the occupants of vehicles passing over the test apparatus;

FIGURE 6 is a schematic circuit diagram of the illuminable and audible indicating means, the switch means and the associated circuit components of the indicator of the invention;

FIGURE 7 is a schematic diagram of the switch means in a position corresponding approximately to a test revealing poor or bad alinement; and FIGURE 8 is a schematic diagram of the switch means in a position corresponding approximately to a test revealing hazardous driving conditions.

Referring to the drawings, and particularly to FIGURE 1, the wheel alinement or scuff determining apparatus includes a drive-over wheel supporting surface 1 and a vertically extending standard or indicator housing 2. Within the housing 2 an indicator 3 is provided, the same including a pivotally movable indicator needle 4 fixed on a pivot shaft 4a and a dial 5 having graduated markings 6 thereon disposed to opposite sides of a central zero.

The indicator shaft 4a and needle 4 are caused to move angularly by mechanism (not shown) equivalent to that disclosed in the patent to Duby 1,890,218 previously mentioned. The mechanism involved is connected to be actuated by scuff determining or measuring bars 8 (one shown) which project upwardly through slots 9 in the wheel support 1. The bars 8 are adapted to be moved longitudinally of their lengths transversely of the vehicle in the direction of and by an amount proportioned to the scuffing or side drag of the tires on the wheels rolling thereover. Therefore, the indicator needle 4 pivots to one side or the other of its central zero to a reading on the graduated dial 5 determined by the movement of the bars 8 in response to the side drag or scuffing of the tires.

A reset treadle 10 is hinged at 11 to the leading end of the support 1, i.e., that end thereof first contacted by a vehicle in its passage over said surface. The treadle 10 carries an angle 12 which is connected to one end of a link 14, the other end 16 of which is secured by a swivel connection to a reset lever 17. The lever 17 is pivoted to the surface 1 on a pivot pin 18 intermediate its ends, and the same is provided at its inner end with a yoke 20 which freely engages a pin 21 movable in a slot 22 in the surface 1.

The pin 21 is connected to correcting mechanism (not shown), which may be of the type disclosed in Duby 1,890,218, and which resets the indicator needle 4 to the zero position on the dial 5 each time the pin 21 is moved to the right by the reset lever 17. Movement of the reset lever 17 to the right occurs when the reset treadle 10 is depressed by passage thereover of vehicle wheels. Upon release, the reset treadle 10, the reset lever 17 and the pin 21 are returned to normal position by a spring 23.

To the extent thus far described, the apparatus in general comprises the scuff measuring or determining device of the Duby patent. As will become apparent as the description proceeds, the present invention is readily applied to this apparatus, and to other known scuff measuring apparatus, such as for example as that shown in my Patent 2,883,762. Also, the testing apparatus may include various attachment devices, such as the automatic punch card attachment 24a–24b illustrated in FIGURE 1, which is described and claimed in the patent to McCormick 3,129,516, without interfering with the indicating means of the present invention, or vice-versa.

In a preferred embodiment of the present invention, as shown particularly in FIGURES 2 to 4, I mount a switch holder 30 on the pivot shaft 4a of the pointer or needle 4 for conjoint movement therewith. This holder in turn carries a plurality of position responsive switches, which in the illustrated device are comprised of six mercury switches 32a, 32b, 32c, 32d, 32e and 32f. To retain the switches in operative position on the shaft, the holder 30 comprises a pair of spaced collars 34 journalled on the shaft and adjustably locked thereto by respective set screws 36, an integral base portion 38 extending between said collars parallel to and below the shaft 4a, and a pair of bosses 39 extending upwardly from the central portion of the base to opposite sides of the shaft 4, the bosses carrying a spirit level 40 which bridges the shaft and facilitates adjustment of the holder on the shaft.

At equal distances to opposite sides of the longitudinal center line thereof, the base 38 is provided with two rows of six holes, each hole in each row being alined with a respective switch 32 whereby two laterally spaced holes are alined with each switch. As shown in FIGURE 4, the holes are of two varieties, namely one simply the second drilled and tapped through the base and an drilled through the base (the left one in FIGURE 4) and integral depending stud or fulcrum member (shown at the right as 42a in FIGURE 4). For each of switches 32a, 32b and 32c, the respective depending fulcrum 42a, 42b and 42c is disposed at the right (as shown in FIGURES 2 and 4), and for the switches 32d, 32e and 32f, the respective depending fulcrum 42d, 42e and 42f is disposed at the left (i.e. the reverse of the relative position shown in FIGURE 4).

Mounted at one end on each of the fulcrums 42 is a clip type retainer for each switch, namely, retainers 44a, 44b, 44c, 44d, 44e and 44f. Each retainer is of a conventional type including a base portion and two pairs of spaced parallel resilient spring fingers for detachable reception therebetween of the glass envelope or tube of the respective mercury switch 32. Two pairs of firmly grasping fingers are preferably provided to insure fixed mounting of the switch in desired position. One end of the base of each retainer is secured to the respective fulcrum 42 by a screw 46 (or other suitable fastener) extended upwardly through the clip and threaded into the tapped hole in the fulcrum. Extended downwardly through the other hole alined with the respective switch is a second screw 47 (or other suitable adjustable device) that may be either threaded through the hole in the holder base and captivated on the retainer base, or passed slidably through the holder base and threaded into the retainer base, thereby to afford means adjustably mounting the one end of the retainer to facilitate tiltable adjustment of the respective retainer and switch in its vertical plane relative to the holder 30.

A compression spring 48 is disposed between the center of each retainer base and the holder base to maintain the retainer in its adjusted position.

The six switches 32 of the assembly 30 are respectively adjusted to facilitate actuation of certain signal and alarm devices that are preferably incorporated in a sign 50, which sign is illustrated in its preferred embodiment in FIGURE 5. The sign essentially comprises a rectangular box that may be mounted atop the indicator housing 2 of the test apparatus, on a wall adjacent the test apparatus, or at any other location conveniently visible to the vehicle operator as he drives his vehicle over the platform 1. The box-like sign is provided on the front face thereof with five separately illuminable panels 52a, 52b, 52c–d, 52e and 52f, each enclosing one or more light bulbs and adapted to be illuminated upon energization of the respective bulb or bulbs.

The panels 52a and 52f bear the legend "extreme—75%—tire waste," and are preferably correlated to thirty and more feet of side drag or scuffing per mile—as a result of excessive toe-in in the case of panel 52a and excessive toe-out in the case of panel 52f. The panels 52b and 52e bear the legend "excessive—50%—tire waster," and are preferably correlated to approximately eleven to twenty-nine feet of side drag per mile—as a result of excessive toe-in in the case of panel 52b and excessive toe-out in the case of panel 52e. The center panel 52c–d bears the legend "good," and is intended to reveal that vehicle toe, resulting in a side drag within plus or minus ten feet of zero, is not excessive and that the alinement condition of the vehicle wheels is satisfactory. Other legends, may, of course, be used as desired, and the ranges of side drag or scuffing to which the panels are correlated may be changed and/or supplemented as desired.

The switches 32 are selectively opened and closed upon and proportionally to rotation of the shaft 4a to effect selective illumination of the panels 52; a preferred electrical circuit for coupling the switches and the light bulbs in the panels being illustrated in FIGURE 6 wherein the bulbs in the panels 52a, 52b, 52c–d, 52e and 52f are indicated respectively at 62a, 62b, 62c–d, 62e and 62f. The assembly of the bulbs, together with certain auxiliary equipment, is preferably mounted within the sign 50, while the switch assembly 30 is mounted within the housing 2. To illustrate the physical separation of the two sub-assemblies, the sign mounted sub-assembly is shown in the upper half of FIGURE 6, the test apparatus mounted sub-assembly is shown in the lower half of the figure, and the two assemblies are illustrated as being interconnected by electrical leads of variable length depicted by dotted lines.

Power is supplied to the circuit from a conventional 110 v. AC supply, and preferably reduced to a convenient safe operating voltage, for example twelve volts, by a conventional transformer T. An on-off master switch MS is preferably incorporated in the supply circuit, and an indicator lamp L is connected across the secondary of the transformer to indicate the fact of master energization. One side of the transformer secondary is connected directly to one side of the bulb 62c–d and via bus 70 to the corresponding sides of each of the bulbs 62a, 62b, 62e and 62f. The other side of the transformer secondary is connected by a lead 71 and appropriate branch leads to one contact of each of the switches 32a, 32b, 32d, 32e and 32f. The other contacts of switches 32a, 32b, 32e and 32f are connected by respective leads 72a, 72b, 72e and 72f to the other contact of the bulbs 62a, 62b, 62e and 62f, respectively. One contact of switch 32c is connected to the remaining contact of the lamp 62c–d by a lead 72c–d; and the remaining contacts of switches 32c and 32d are interconnected by a jumper 73, whereby the switches 32c and 32d and the lamp 62c–d are connected in series circuit with one another.

While not essential, a push-on-push-off switch 74 is preferably included in the branch of lead 71 extending to the switch 32d. The switch 74 is shown in FIGURE 1 as associated with one end of the lever 17 whereby the same is pushed on when the front wheels of a vehicle depress the treadle 10 and is pushed off when the rear wheels of the vehicle depress the treadle 10. Thus, the switch serves to de-energize the circuit of switches 32c–32d and bulb 62c–d when the unit is not actually conducting a test on the front wheels of a vehicle, and has been re-set to zero.

In use of the apparatus, depression of the treadle 10 upon passage thereover of a first set of vehicle wheels (the front wheels) will re-set the pointer 4 and the shaft 4a to zero position and close the switch 74. These two actions will result in energization of the light bulb 62c–d via switches 32c and 32d, since these switches are both closed when the pointer is at zero or within a scale indication of ten or less feet of side drag per mile (in the example herein described). The bulbs 62a, 62b, 62e and 62f do not become illuminated since the switches 32a, 32b, 32e and 32f are all open when the pointer is within a scale indication of ten or less feet of side drag. Immediately after striking the treadle 10, the front wheels roll over the side scuff bars 8, whereupon the pointer 4 remains steady or shifts to one side or the other of zero depending upon the toe condition of the vehicle wheels. If the toe condition results in a side drag of ten or less feet per mile, the bulb 62c–d remains energized and the bulbs 62a, 62b, 62e and 62f remain de-energized, whereby only the panel 52c–d is illuminated to reveal that wheel alinement is "good."

If, however, the vehicle front wheels are toed-in excessively, and result in more than ten feet per mile of tire side drag (e.g., within the range of 11 to 29 feet), the pointer shaft will tilt the upper end of the switch assembly 30 (as it is shown in FIGURE 6) sufficiently far to the left to open switch 32d and close switch 32b, whereupon bulb 62c–d is de-energized and bulb 62b becomes energized. If the vehicle is toed-out excessively, the switch will swing in the opposite direction, i.e., its upper end will swing to the right as shown in FIGURE 6 sufficiently far that the switch 32c will open and the switch 32e will close, whereupon the bulb 62c–d will be de-energized and the bulb 62e will be energized. The latter condition of the switch assembly 30 is illustrated in FIGURE 7. In the illustrated position (representing for example from 11 to 29 feet of side drag produced by excessive toe-out), the switches 32a, 32b, 32c and 32f are opened, whereby all bulbs are de-energized except bulb 62e, whereupon only panel 52e will be illuminated to reveal that the vehicle is so badly toed out as to result in about "50% waste" of the tires, which obviously is "excessive."

If the vehicle wheels are even more badly toed-out (e.g. to result in 30 or more feet of side drag), the switch assembly 30 will tilt further to the right to the position shown in FIGURE 8, wherein switches 32a, 32b and 32c are opened and switches 32d, 32e and 32f are closed. Upon closing of the switch 32f, a circuit is closed to light bulb 62f and also to the parallel coupled coil of a switching relay 82f. The switching relay 82f includes a movable contact actuated upon energization of the coil and a stationary contact engaged by the movable contact when the coil is not energized and disengaged when the coil is energized. One of said contacts is coupled to the switch 32e, and the other is coupled to the bulb 62e, whereby normally to complete the circuit to the bulb 62e upon closing of the switch 32e. However, when the relay 82f is energized by virtue of closing of switch 32f, said movable contact is disengaged from said stationary contact whereby the circuit to the bulb 62e is opened and only the bulb 62f is energized. Thus, only panel 52f of the sign 50 is illuminated to reveal that the vehicle is so grossly toed-out as to result in "75% waste" of the tires, which is "extreme."

Moreover, side drag or scuffing in excess of 30 feet per mile reveals that the vehicle steering system is so grossly out of adjustment as to produce a hazardous driving condition. To call this fact to the attention of the vehicle operator or owner with significant emphasis to insure that the condition, and the presence of this hazard on the highways, will be remedied, I incorporate an audible alarm 92f, such as a buzzer or horn, in the circuit of the bulb 62f so that the owner is warned both visually and audibly of the hazard. The buzzer is preferably coupled in parallel with the bulb 62f and the coil of relay 82f whereby, upon energization of the switch 32f, the bulb 62e is de-energized and the bulb 62f and the alarm 92f are energized.

A comparable circuit arrangement is provided for warning of extreme toe-in, the circuit of switch 32a including a switching relay 82a and an alarm buzzer 92a (identical to the relay 82f and buzzer 92f) energized simultaneously upon closing of switch 32a.

To place further emphasis on the hazards inherent in wheel mis-alinement, I prefer to have the panels 52a, 52b, 52e and 52f flash on and off when they are illuminated, and to have the buzzers 92a and 92f buzz intermittently with staccato effect; but I prefer the "good" signal 52c–d to be a steady illumination, for example in green color. To the stated ends, the bulb 62c–d is directly coupled to the transformer T, the bulbs 62a, 62b, 62e and 62f and the buzzers 92a and 92f are coupled to the transformer by the bus 70, and the contacts of an automatic flasher switch 100 are connected in series in the bus. The motor or motor means for the flasher contacts may be connected across the leads of the main power supply to the output side of the main switch MS. Thus, the flasher contacts open and close continuously, and whenever any one of the bulbs 62a, 62b, 62e and 62f is energized, the same will automatically flash on and off, and the buzzers 92a and 92f will, when energized, produce an effective audible warning.

After the front wheels of the vehicle have passed over the device and have been tested in the manner described, the rear wheels of the vehicle will run over the treadle 10 and thus re-set the apparatus to zero and operate the switch 74 to off position, whereupon the lights and bells are de-energized. Usually, the rear wheels of the vehicle do not produce sufficient side drag or scuffing to cause actuation of the test instrument, and the vehicle simply continues over the platform 1 to the next service area. However, in vehicles having rear wheel caster, camber or toe, or vehicles having rear wheels which actually are so out of alinement as to produce more than ten feet of side drag per mile, switching of the switch 74 to off position does not de-energize the circuits of panels 52a, 52b, 52e, and 52f, and these circuits are still operable to reveal the fact of "excessive" or "extreme" side drag resulting from either toe-in or toe-out of the rear wheels. Thus, an effective test for rear wheel alinement is afforded.

The particular mounting of the switch retainers 44 by the fulcrum means 42–46 and the adjusting screws 47 greatly facilitates adjustment of the six switches 32 to satisfy the requirements of the art. In the specific embodiment illustrated and described, the pointer 4 of the test instrument is initially set to zero, thereby setting the shaft 4a to its zero position. The switch holder 30 is then leveled on the shaft by relatively rotating the same to cause the bubble of the spirit level 40 to be centered, whereafter the holder is locked on the shaft 4a by the set screws 36.

The pointer 4 is then manually swung to a dial reading of ten feet "in" and held in such position while the adjusting screw 47 for the switch 32d is rotated back and forth to cause the light 62c–d to be on from zero to ten feet and to go off at ten feet "in." The pointer is then shifted toward eleven feet "in" and the screw 47 for the switch 32b is adjusted to cause that switch to be off up to ten feet "in" and to go on just over ten feet "in" and to remain on for all "in" readings in excess of ten feet. The pointer 4 is then swung to thirty feet "in" and the screw 47 for the switch 32a is adjusted to cause that switch to be off up to thirty feet "in," to go on at thirty feet "in" and to remain on for all "in" readings of thirty feet and over.

The pointer 4 is then manually swung back to zero and around to a dial reading of ten feet "out," whereupon the switch 32c is adjusted to go off at the ten foot "out" reading. The switches 32e and 32f are then adjusted at pointer settings of eleven feet "out" and thirty feet "out," respectively, in manner comparable to the adjustment of the switches 32b and 32a, whereupon to complete adjustment of the switch assembly to afford the operating characteristics previously described herein. Other adjustments may, of course, be effected as desired.

From the foregoing, it is manifest that the present invention affords an economical and highly advantageous method of visually and audibly indicating to a vehicle operator the steering and roadability condition of the vehicle he is driving. Thus, the objects and advantages of this invention have been shown herein to be attained in a convenient, economical and practical manner.

While I have shown and described what I regard to be the preferred embodiment of my invention, it will be appreciated that various changes, rearrangements and modifications may be made therein without departing from the scope of the invention, as defined by the appended claims.

I claim:

1. In vehicle wheel scuff testing means having scuff determining means normally set to a zero position and movable in proportion to the amount of scuff of vehicle wheels passing thereover, a plurality of switch means associated with the scuff determining means and a plurality of indicating means connected in circuit with respective ones of the switch means for indicating respective degrees of scuff; and also having an indicator remote from the scuff determining means and including an indicator shaft connected with the scuff determining means and rotatable in proportion to the amount of scuff; the improvement comprising a holder mounted on said shaft for rotation therewith, a plurality of individually adjustable switch retainers mounted on said holder in generally horizontal positions at right angles to said shaft, an adjusting screw operatively associated with each retainer and extending generally vertically through the holder and into operative association with the respective retainer for tiltably adjusting the retainer in the vertical plane of the retainer and its screw, and an individual self-contained switch detachably mounted in each of said retainers, said screws being individually adjustable to vary the operation of the respective switch in accordance with varying degrees of shaft rotation whereby individually to control energization of the respective indicating means.

2. In means as set forth in claim 1, said switches including a first switch closed upon rotation of the shaft within and beyond a pre-determined range from the zero position, a second switch opened within said pre-determined range and closed upon rotation of the shaft beyond said pre-determined range, and relay means including a coil in series with one of said switches and normally closed contacts in series with the other of said switches, one of the indicating means being connected in series with said contacts and a second one of the indicating means being connected in parallel with said coil, whereby closing of said first switch while said second switch is open results in energization of one of the indicating means to signal a first degree of scuff and closing of both of said switches results in de-energization of the one indicating means and energization of the other indicating means to signal a different degree of scuff.

3. In means as set forth in claim 1 having a shaft oscillatable to opposite sides of a central zero position, the said switches on said shaft being six in number, three of the switches being operative upon rotation of the shaft in one direction from its zero position and the other three being operative upon rotation of the shaft in the opposite direction from its zero position, one switch of each of the two groups of three switches being connected in series circuit with one another and one of the indicating means, each of the remaining switches being connected to respective other indicating means, said switches being individually adjustable to vary the operation of the respective switch in accordance with varying degrees of shaft rotation in the respective direction whereby to control energization of the respective indicating means.

4. In means as set forth in claim 1, said switches including a first switch closed at and within a pre-determined range of the zero position of the shaft and opened upon rotation of the shaft beyond said range, and a second switch opened at and within said pre-determined range of the zero position and closed upon rotation of the shaft beyond said pre-determined range.

5. In means as set forth in claim 4, flasher switch means in series with said second switch and the indicating means connected thereto for producing an intermittently repetitive indication of scuff beyond said pre-determined range.

6. In means as set forth in claim 4, said second switch being closed upon rotation of the shaft beyond the first-named pre-determined range and within a second pre-determined range, said switches including a third switch opened at and within said first and second pre-determined ranges and closed upon rotation of the shaft beyond said ranges.

7. In means as set forth in claim 6, flasher switch means in series with said second and third switches and the indicating means respectively connected thereto for producing intermittently flashing indications of scuff within and beyond said second pre-determined range, and electrically energized audible signal means electrically coupled in the circuit of said third switch for producing an audible indication in addition to the flashing visual indication.

8. In means as set forth in claim 1 having a shaft oscillatable to opposite sides of a central zero position, one of said switches being adjusted to maintain the one switch closed from a pre-determined degree of shaft rotation to one side of the zero position throughout rotation of the shaft toward and to the opposite side of said zero position, a second switch being adjusted to maintain the second switch closed from an equal degree of shaft rotation to said opposite side of the zero position throughout rotation of the shaft toward and to said one side of the zero position, said first and second switches being connected in series circuit, a third switch being adjusted to maintain the third switch closed from substantially said pre-determined degree of shaft rotation to said one side of the zero position throughout shaft rotation to said one side of the zero position beyond said pre-determined degree, a fourth switch being adjusted to maintain the fourth switch closed from substantially said pre-determined degree of shaft rotation to said opposite side of the zero position throughout shaft rotation to said opposite side of the zero position beyond said pre-determined degree, one of the indicating means being coupled in series circuit with said first and second switches, a second indicating means being coupled in circuit with said third switch and a third indicating means being coupled in circuit with said fourth switch, whereby to provide separate indications of scuff within said pre-determined degree of zero, in excess of said pre-determined degree in one direction and in excess of said pre-determined degree in the other direction.

9. In means as set forth in claim 8, a fifth switch being adjusted to maintain the fifth switch closed from a second pre-determined degree of shaft rotation to one side of the zero position in excess of said first pre-determined degree throughout shaft rotation to said one side of zero position beyond said second pre-determined degree, a sixth switch being adjusted to maintain the sixth switch closed from a degree of shaft rotation to said opposite side of the zero position substantially equal to said second pre-determined degree and throughout shaft rotation to said opposite side of said zero position beyond said second pre-determined degree, a fourth indicating means being coupled in circuit with said fifth switch and a fifth indicating means being coupled in circuit with said sixth switch, means in circuit with said fifth switch for opening the circuit of said third switch, and means in circuit with said sixth switch for opening the circuit of said fourth switch, whereby further to provide separate indications of scuff in excess of said second pre-determined degree of zero in each of the two directions.

References Cited

UNITED STATES PATENTS

| | | | |
|---|---|---|---|
| 1,375,278 | 4/1921 | Clayton | 33—206.5 |
| 1,988,327 | 1/1935 | Musselman | 33—203.14 |
| 2,003,964 | 6/1935 | Black | 340—267 |
| 2,350,240 | 5/1944 | Leister et al. | 33—206.5 |
| 2,484,664 | 10/1949 | Ziers | 340—271 |
| 2,598,599 | 5/1952 | Pleasance | 33—203.13 |
| 2,805,410 | 9/1957 | Colt | 340—282 |
| 3,039,086 | 6/1962 | Inc et al. | 340—267 |
| 3,252,224 | 5/1966 | Taylor | 33—203.12 |

LEONARD FORMAN, *Primary Examiner.*

W. MARTIN, JR., *Assistant Examiner.*